United States Patent
Tao et al.

(10) Patent No.: US 12,441,383 B2
(45) Date of Patent: Oct. 14, 2025

(54) DEVICE RACK WITH BRAKING FUNCTION

(71) Applicant: NINGBO SOMLE AUDIO-VISUAL TECHNOLOGY CO., LTD, Ningbo (CN)

(72) Inventors: Liming Tao, Ningbo (CN); Bin Wang, Ningbo (CN)

(73) Assignee: NINGBO SOMLE AUDIO-VISUAL TECHNOLOGY CO., LTD, Ningbo (CN)

( * ) Notice: Subject to any disclaimer, the term of this patent is extended or adjusted under 35 U.S.C. 154(b) by 251 days.

(21) Appl. No.: 18/334,036

(22) Filed: Jun. 13, 2023

(65) Prior Publication Data

US 2023/0322287 A1    Oct. 12, 2023

(30) Foreign Application Priority Data

Feb. 9, 2023  (CN) .......................... 202310159775.2

(51) Int. Cl.
*B62B 5/04*      (2006.01)
*B60B 33/00*    (2006.01)
*F16M 11/42*   (2006.01)

(52) U.S. Cl.
CPC .......... *B62B 5/049* (2013.01); *B60B 33/0089* (2013.01); *B62B 5/04* (2013.01); *B62B 5/0438* (2013.01); *F16M 11/42* (2013.01)

(58) Field of Classification Search
CPC ........ B62B 5/049; B62B 5/04; B62B 5/0438; F16D 63/00; B60B 33/0089; F16M 11/42; F16M 2200/027

USPC ............................................................ 188/5
See application file for complete search history.

(56) References Cited

U.S. PATENT DOCUMENTS

| | | | | |
|---|---|---|---|---|
| 3,923,280 A * | 12/1975 | Good | ....................... | A47C 3/24 248/405 |
| 4,077,086 A * | 3/1978 | Butler | ................. | B60B 33/0089 16/33 |
| 4,526,334 A * | 7/1985 | Rantakari | .............. | F16M 11/26 248/412 |
| 4,648,613 A * | 3/1987 | Hennessy | ............... | B62B 5/049 74/99 A |
| 6,131,870 A * | 10/2000 | Tseng | ....................... | A47B 9/04 248/405 |
| 6,591,449 B1 * | 7/2003 | Parkin | ................. | B60B 33/0089 16/35 R |
| 8,365,353 B2 * | 2/2013 | Block | ................. | B60B 33/0028 16/35 R |

(Continued)

FOREIGN PATENT DOCUMENTS

| | | | | |
|---|---|---|---|---|
| DE | 4321739 A1 * | 1/1995 | ............... | A61G 7/00 |
| DE | 202012001392 U1 * | 5/2012 | ............. | B62B 3/005 |

(Continued)

*Primary Examiner* — Taylor Morris (57) ABSTRACT

A device rack with a braking function includes a base, a column tube, a mounting member, a plurality of universal rolling members and a brake member telescopically and movably arranged to form the device rack with a braking release state and a braking state. The base achieves centered braking on the support surface by controlling the linked brake member, which facilitates a user to adjust operating state of the device rack to switch between a rotatable and translatable braking release state and a rotatable-only braking state.

10 Claims, 5 Drawing Sheets

(56) References Cited

U.S. PATENT DOCUMENTS

| | | | |
|---|---|---|---|
| 8,943,648 B2 * | 2/2015 | Fanourgiakis | B60B 33/0089 |
| | | | 16/24 |
| 10,688,826 B2 * | 6/2020 | Hall | B60B 33/063 |
| 10,960,911 B2 * | 3/2021 | Hynes | A61G 12/001 |
| 2007/0215777 A1 * | 9/2007 | Mills | F16C 29/04 |
| | | | 384/49 |
| 2017/0051869 A1 * | 2/2017 | Hsiao | F16M 11/18 |
| 2019/0187754 A1 | 6/2019 | Janzen et al. | |
| 2019/0203875 A1 | 7/2019 | Yu et al. | |
| 2021/0247018 A1 | 8/2021 | Yamada | |

FOREIGN PATENT DOCUMENTS

| | | | | |
|---|---|---|---|---|
| GB | 574386 A | * | 1/1946 | B62B 5/049 |
| KR | 20100106833 A | * | 10/2010 | B62B 5/049 |

\* cited by examiner

DEVICE RACK WITH BRAKING FUNCTION

TECHNICAL FIELD

The present invention pertains to the technical field of display device racks, and specifically pertains to a device rack with a braking function.

BACKGROUND

At present, with the development of society, audiovisual devices such as displays and tablets become more and more popular. These audiovisual devices are usually plate-like structures. Due to large volume and heavy weight, they usually need to be safely supported by means of racks for users to watch. For the convenience of moving the position of an existing rack, universal rollers are arranged on a base, and movement or standstill of the rack on a support surface is supported by the roller. For example, Patent No. CN217875118U discloses a display liftable rack which comprises a base and a column, the base is connected with a bottom of the column, a top of the column is connected with a display connection rack, and a plurality of pulleys are arranged around a periphery of the base, and the pulleys are used for moving the base. When a user uses the rack, in order to meet the viewing comfort, the rack is usually translated or the height of the display is adjusted by means of the pulleys according to own need, so as to adjust to a position for the user to see clearly, which is beneficial to the health of the user's cervical spine and eyes.

However, when the user adjusts an azimuth angle of the display by rotating, the pulleys roll to drive the base to move, so that a fixed position of the rack on the support surface changes, which makes it difficult to ensure that a distance between the display and the user is maintained within a suitable range, and the user also needs to adjust the position of the rack several times, compromising user experience.

SUMMARY

The purpose of the present invention is to provide a device rack with a braking function in order to solve the above-mentioned technical shortcomings. By linking a brake member, a base achieves centered braking on a support surface, which is convenient for a user to arrange the rack around the brake member to adjust an azimuth angle of a display, and ensures that a distance between the display and the user is maintained within a suitable distance when the angle is adjusted to improve user experience.

The device rack with a braking function of the present invention comprises a base for being placed on a support surface, a column tube having a bottom end connected with the base, a mounting member for being fixed to the column tube, a plurality of universal rolling members provided on a bottom surface of the base, a brake member telescopically and movably arranged on the bottom surface of the base, and a gear adjusting mechanism for controlling telescopic movement of the brake member. The brake member is controlled by the gear adjusting mechanism to extend or retract relative to the bottom surface of the base so as to be linked with the brake member to be switched to a braking release state or a braking state.

In the braking release state, the brake member is separated from the support surface, and the base is simultaneously rotatably and translatably arranged relative to the support surface, so that the device rack can be arbitrarily translated, rotated or translated and rotated simultaneously. In the braking state, the brake member extends to contact the support surface so as to lock displacement movement of the base relative to the support surface instead of rotary movement by friction between the brake member and the support surface, so that the base is only rotatably arranged about the brake member instead of being translatably arranged.

Compared with the prior art, the present invention has the following beneficial effects: for the device rack with a braking function of the present invention, the mounting member is connected with the base via the column tube, any audiovisual device such as a display and tablet can be dismounted and mounted on the mounting member, the base is rotatably and translatably arranged on the support surface via the universal rolling members, so that the user can adjust the position of the audiovisual device, and when the distance between the rack and the user is suitable, the user links the brake member via the gear adjusting mechanism to make it extend from the base and interfere with the support surface, so that the base achieves the centered braking on the support surface, and the brake member is arranged at the underside of the column tube to further strengthen the centered braking of the rack by means of the weight of the column tube and the mounting member, so that the base can be rotatably arranged around the brake member to adjust the azimuth of the display and ensure that the distance between the display and the user is maintained within a suitable range when the azimuth angle of the display is adjusted, which improves the user experience.

The device rack with a braking function of the present invention is controlled by the linked brake member to achieve centered braking of the base on the support surface, which facilitates the user to adjust operating state of the device rack to switch between a rotatable and translatable braking release state and a rotatable-only braking state. Moreover, the switching operation can be preferably achieved by rotating or pressing, which is easy to operate.

Reference numerals in the drawings: 1. base; 2. column tube; 21. upper column; 22. lower column; 3. mounting member; 4. mounting cavity; 5. universal rolling member; 6. brake member; 61. rubber block; 62. first elastic member; 7. drive rod; 71. screw; 72. upper shaft rod; 73. lower shaft rod; 8. gear adjusting mechanism; 81. rotary handle; 82. connecting end cap; 9. drive hole; 10. bearing member; 11. telescoping mechanism; 111. mounting bracket; 112. Guide column; 113. mounting housing; 12. movable hole; 13. through hole; 14. limiting member; 15. gear cavity; 16. mounting tube; 17. gear member; 18. second elastic member; 19. connector; 20. support hole; 23. coupling; 24. mounting column; 25. lock sleeve.

DESCRIPTION OF THE EMBODIMENTS

The present invention is further described below by way of embodiments with reference to the accompanying drawings.

Figure 1:
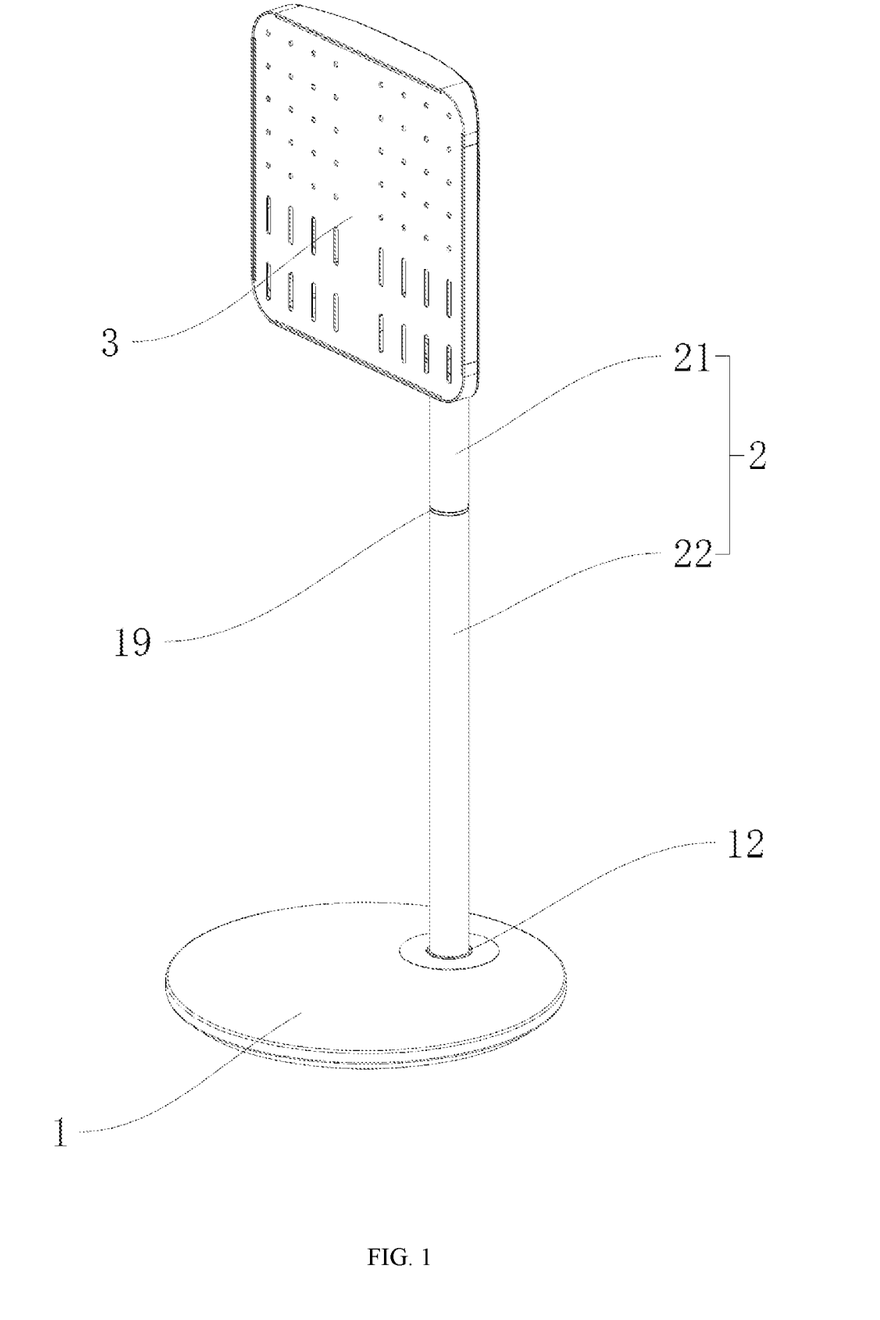
FIG. 1 is a structural schematic diagram I of a rack in an embodiment.
Figure 2:
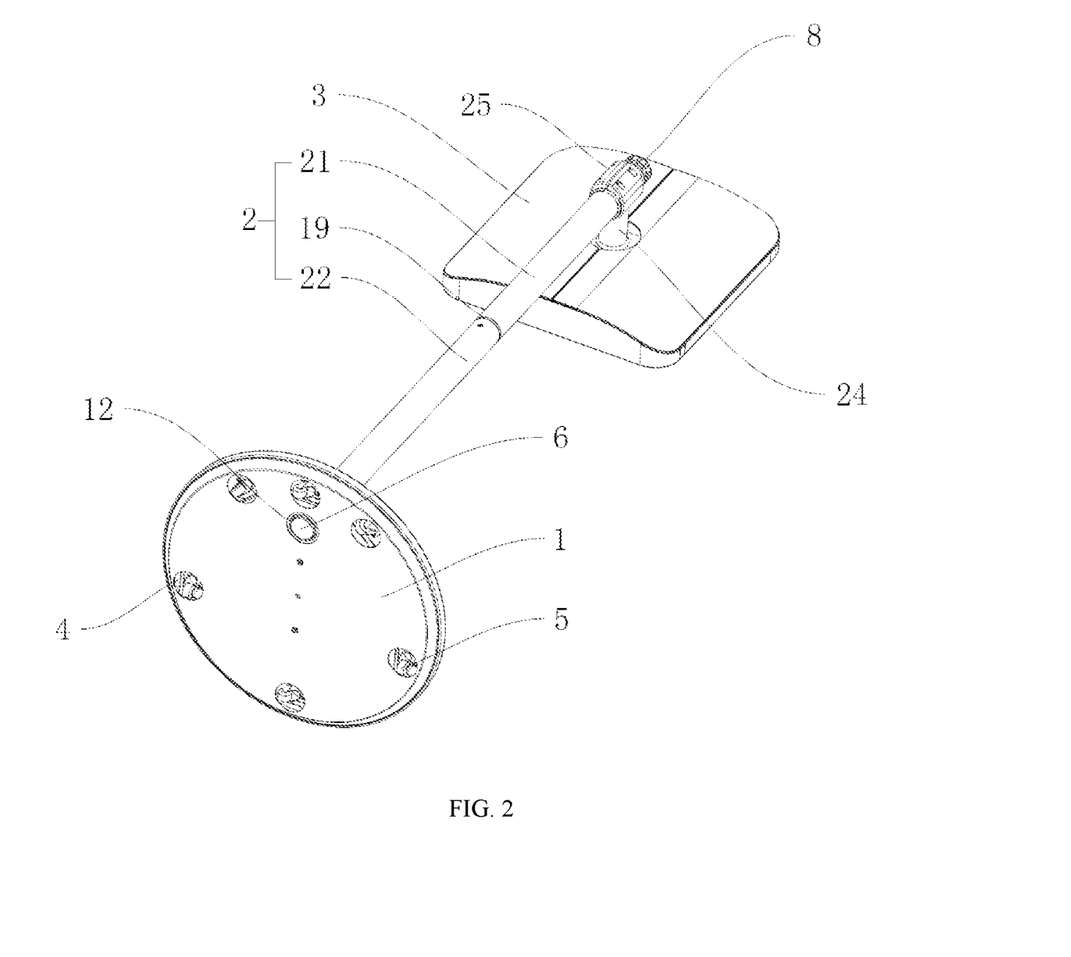
FIG. 2 is a structural schematic diagram II of the rack in the embodiment.
Figure 3:
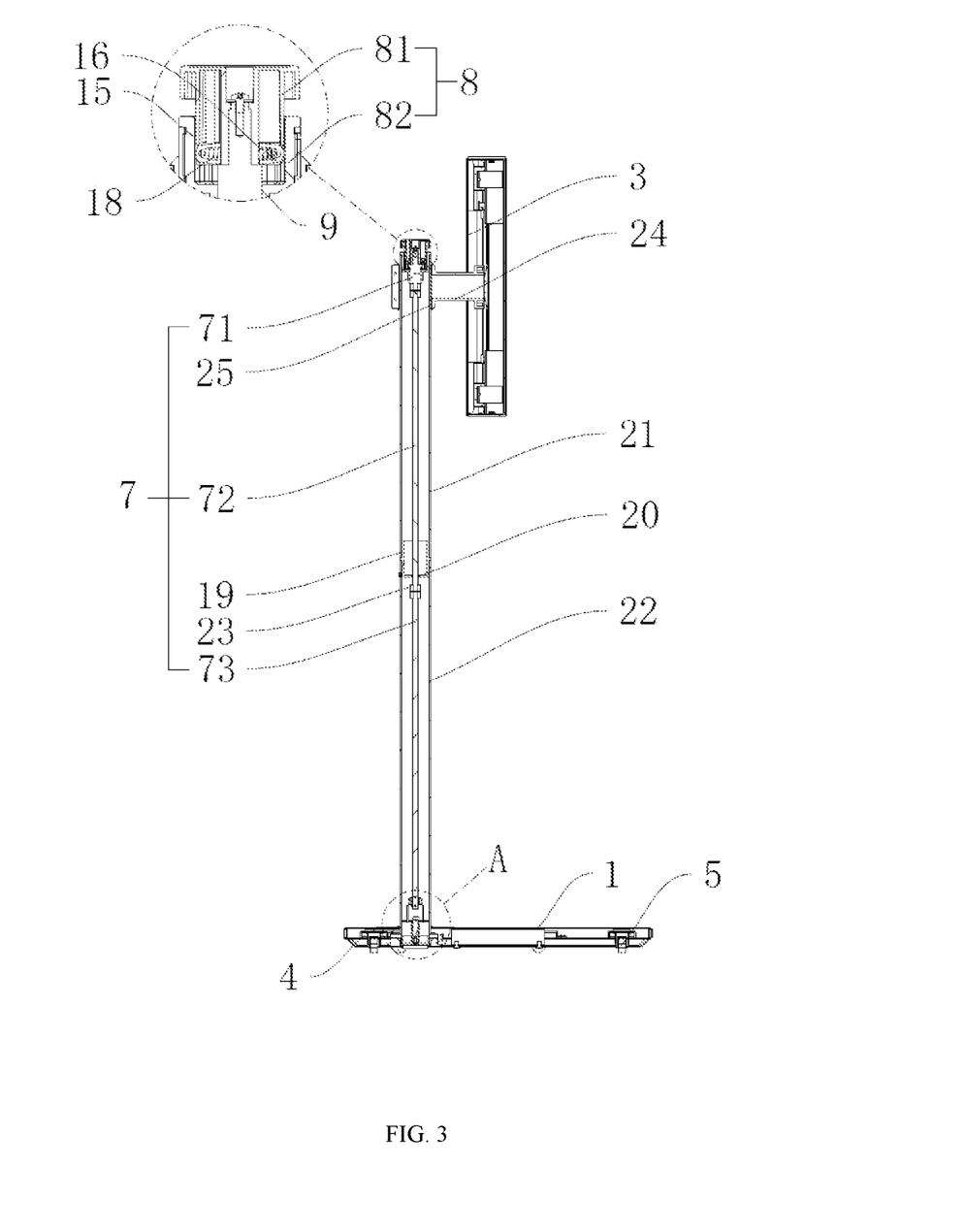
FIG. 3 is a sectional view I of the rack in the embodiment.
Figure 4:
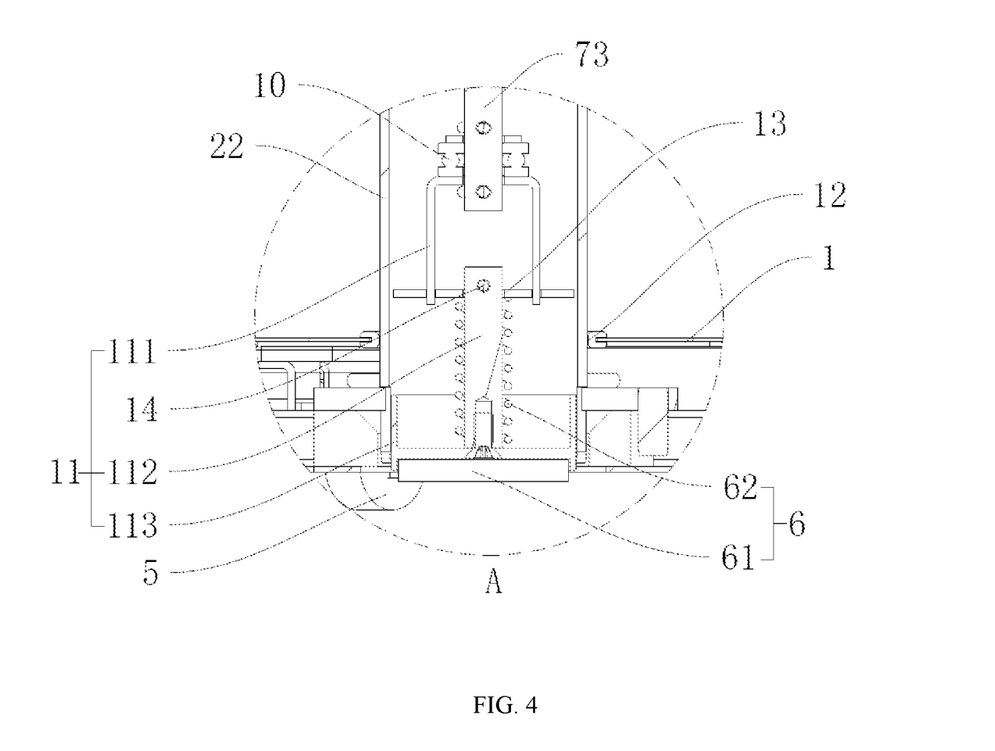
FIG. 4 is an enlarged view of A in FIG. 3.
Figure 5:
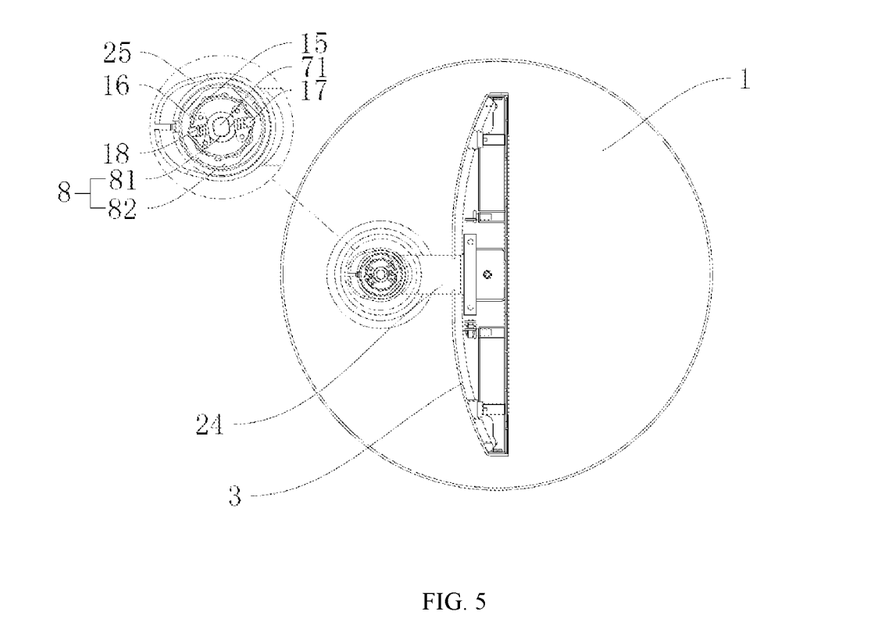
FIG. 5 is a sectional view II of the rack in the embodiment.
Figure 6:
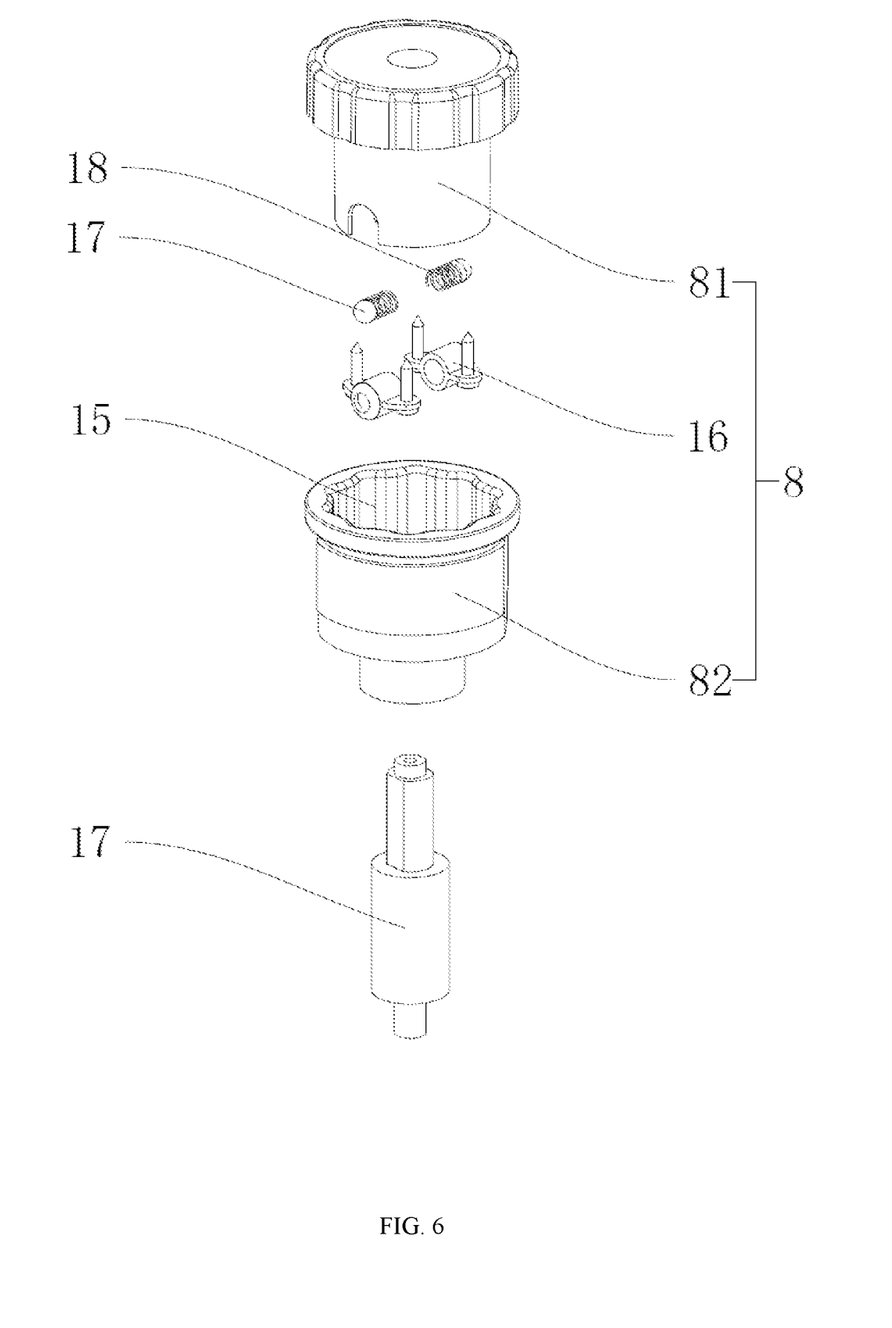
FIG. 6 is an exploded view of a gear adjusting mechanism in the embodiment.

Referring to FIGS. 1 to 6, a device rack with a braking function comprises a base 1, a column tube 2, a mounting member 3, a brake member 6 and a drive rod 7. The column tube 2 comprises an upper column 21 and a lower column 22, a connector 19 is provided between the upper column 21 and the lower column 22, both ends of the connector 19 are detachably connected with the upper column 21 and the lower column 22 respectively, and the connector 19 is provided with a support hole 20 in the penetrating manner for the drive rod 7 to be slidingly connected. The base 1 is provided with a movable hole 12 in a penetrating manner for mounting the lower column 22, the mounting member 3 is a plate-like structure and provided with a mounting column 24, the mounting column 24 is provided with a lock sleeve 25 sleeved on the column tube 2, the lock sleeve 25 and the mounting column 24 are perpendicular to each other, and the lock sleeve 25 has an opening. The lock sleeve 25 can be expanded or tightened by screwing bolts in the lock sleeve, and the lock sleeve 25 is the prior art and will not be detailed here. After the lock sleeve 25 is sleeved on the column tube 2, the height and azimuth angle of the mounting member 3 relative to the column tube 2 can be adjusted, and the position of the mounting column 24 on the column tube 2 can be locked or unlocked by bolts. If any audiovisual device such as a display and tablet is dismounted or mounted on the mounting member 3, the user can rotate the mounting member 3 by loosening the lock sleeve 25 to adjust the azimuth angle of the audiovisual device, or can adjust the height position of the mounting member 3 on the column tube 2 to adjust the height of the audiovisual device, so that the user can look at the display screen of the audiovisual device mounted on the mounting member 3.

A bottom surface of the base 1 is provided with a plurality of universal rolling members 5 in a surrounding manner. The universal rolling members 5 are, for example, universal casters can rotate 360° horizontally, and the bottom surface of the base 1 is formed with a mounting cavity 4 for mounting the universal rolling members 5, so that bottoms of the universal rolling members 5 expose the mounting cavity 4 and interfere with the support surface, so that the base 1 is simultaneously rotatably and translatably arranged on the support surface.

The brake member 6 is connected with a bottom end of the drive rod 7, and the drive rod 7 is connected in the column tube 2 in an interpenetrating manner, the column tube 2 is provided with a gear adjusting mechanism 8 connected with a top of the drive rod 7, and the brake member 6 is controlled by the gear adjusting mechanism 8 to extend or retract relative to the bottom surface of the base 1, so that the brake member 6 has a braking state and braking release state.

In the braking state, the brake member 6 extends from the base 1 and contacts the support surface so as to interfere with displacement movement of the base 1 relative to the support surface by friction between the brake member 6 and the support surface, and the base 1 is rotatably arranged about the brake member 6.

In the braking release state, the brake member 6 is separated from the support surface, and the base 1 is simultaneously rotatably and translatably arranged relative to the support surface.

When the distance between the bracket and the user is suitable, the user links the brake member 6 via the gear adjusting structure to make it extend from the base 1 and interfere with the support surface to center and brake the rack, and the brake member 6 is arranged at the underside of the column tube 2 to strengthen the centered braking of the rack by means of the weight of the audiovisual device and the rack. A bottom end of the drive rod 7 is provided with a bearing member 10, so that the brake member 6 rotatably moves in the column tube 2, the bearing member 10 is used to assist in supporting the brake member 6 to reduce a friction coefficient during rotation thereof and to ensure a rotation accuracy. The bearing member 10 is the prior art and will not be detailed here. The bearing member 10 is provided so that when the rack is in the state of centered braking, the base 1 rotates flexibly around the brake member 6, which to a certain extent prevents the friction between the brake member 6 and the support surface from interfering with the centered rotation of the rack, so that the user can adjust the azimuth angle of the display and the distance between the display and the user is maintained within a suitable range when the azimuth angle of the display is adjusted, which improves the user experience.

Of course, in other embodiments, it is also feasible to place the brake member 6 under the column tube 2 without arrangement of the bearing member 10 to strengthen the braking effect by means of the weight of the audiovisual device and the rack.

The brake member 6 comprises a rubber block 61 and a first elastic member 62, the bearing member 10 is provided with a telescopic mechanism 11, and the first elastic member 62 is arranged in the telescopic mechanism 11 and is connected with the rubber block 61.

The telescopic mechanism 11 comprises a mounting bracket 111, a guide column 112 and a mounting housing 113, the mounting bracket 111 is connected with the bearing member 10, the mounting bracket 111 is provided with a through hole 13 in a penetrating manner, a top end of the guide column 112 is slidingly connected in the through hole 13, a bottom end of the guide column 112 is connected with the mounting housing 113, and the rubber block 61 is arranged on a bottom of the mounting housing 113 and moves in the movable hole 12 in an interpenetrating manner. The first elastic member 62 is a spring, the first elastic member 62 is arranged between the mounting bracket 111 and mounting housing 113 and is sleeved on the guide column 112, and an end of the guide column 112 exposing the through hole 13 is provided with a limiting member 14, and the limiting member 14 is a columnar structure and is inserted on the guide column 112 to limit placement of the guide column 112 away from the through hole 13.

The gear adjusting mechanism 8 comprises a rotary handle 81 and a connecting end cap 82, the rotary handle 81 is rotatably connected to the connecting end cap 82, the connecting end cap 82 is arranged on a top of the column tube 2, the connecting end cap 82 is provided with a drive hole 9 in a penetrating manner, and a top end of the drive rod 7 is arranged on the rotary handle 81 and is threadedly connected in the drive hole 9.

The drive rod 7 comprises a screw 71, an upper shaft rod 72 and a lower shaft rod 73, the screw 71 is threadedly connected in the drive hole 9, a bottom end of the lower shaft rod 73 is connected with the brake member 6, a coupling 23 is respectively provided between the screw 71 and the upper shaft rod 72 and between the upper shaft rod 72 and the lower shaft rod 73 to form the drive rod 7. The coupling 23 between the upper shaft rod 72 and the lower shaft rod 73 is located in the lower column 22. When the user turns the rotary handle 81, the threaded connection between the screw 71 and the drive rod 7 is utilized to drive the drive rod 7 to translate up and down along an axial direction thereof, thus driving the mounting housing 113 to slide in the movable hole 12, so that the rubber block 61 interferes with or is separated from the support surface. The guide column 112 is used to guide telescopic movement of the first elastic member 62. When the rubber block 61 interferes with the support surface, the first elastic member 62 is compressed and deformed, and cooperates with the guide column to guide the first elastic member 62 to strengthen tightness of the rubber block 61 against the support surface. In addition, by setting a wire diameter and height of a spring as the first elastic member 62, longitudinal dimension deviation of the rubber block 61 can be compensated, and a proper braking force of the rubber block 61 on the support surface can be controlled.

The connecting end cap 82 is formed with a gear cavity 15 for the rotary handle 81 to move, the gear cavity 15 has a wavy ring cross section, the rotary handle 81 is provided with two mounting tubes 16 arranged symmetrically, a gear member 17 is slidingly connected in the mounting tube 16, a second elastic member 18 is provided between the mounting tube 16 and the gear member 17 so that the gear member 17 extends from the mounting tube 16 and interferes with an inner concave portion or an outer convex portion of the gear cavity 15. The gear member 17 is a spherical structure, and the second elastic member 18 is a spring structure. When the user turns the rotary handle 81, an outer curved surface of the gear member 17 interferes with an inner wall of the gear cavity 15 and move along a rotating direction of the rotary handle 81, and when the user stops turning the rotary handle 81, the gear member 17 is separated from the outer convex portion in the gear cavity 15 and interferes with the inner concave portion in the gear cavity 15 under the action of the second elastic parts 18, so that the gear adjusting mechanism 8 adjusts the gear by controlling the telescopic movement of the drive rod 7 through rotation and self-locking of the rotary handle 81 after adjustment of a telescopic rod, so that the user can adjust a friction force of the rubber block 61 against the support surface accurately, further facilitating the braking operation and the braking release operation of the rack.

In the present embodiment, in the braking release state, the brake member 6 is separated from the support surface, so that the base 1 is movably arranged relative to the support surface in a rotatable and translatable manner, so that the user can adjust distance or orientation of the device rack. Specifically, rotation only, translation only or both rotation and translation are presented according to operation of the user. In the braking state, the brake member 6 extends to contact the support surface so as to lock displacement movement of the base 1 relative to the support surface by the friction force between the brake member 6 and the support surface, and the base 1 is rotatably but non-translatably arranged about the brake member 6, so that the user can adjust the orientation of the device rack rather than translating the device rack to adjust the distance.

Although in the above embodiment, the user turns the rotary handle 81 to drive the brake member 6 to extend or retract to switch between the braking release state and the braking state by rotating action, in other embodiments, the brake member 6 can also be driven to extend or retract by pressing action to switch between the braking release state and the braking state. The structure for implementing the pressing action is known. For example, the pressing telescopic structure of the ball-point pen can be used for reference, that is, a combination structure consisting of a slider pressing member, a linear-rotary conversion member, a slider member and a spring is used to implement the pressing operation.

While the present invention has been described with respect to the typical embodiments, the present invention can also have a variety of other specific embodiments, and the technical solutions formed by the use of equivalent replacement or equivalent transformation all fall within the scope of the present invention.

What is claimed is:

1. A device rack with a braking function, comprising:
   a base for being placed on a support surface;
   a column tube having a bottom end connected with the base;
   a mounting member fixed to the column tube;
   a plurality of universal rolling members provided on a bottom surface of the base;
   a brake member telescopically and movably provided on the bottom surface of the base; and
   a gear adjusting mechanism controlling telescopic movement of the brake member relative to the bottom surface of the base;
   wherein the brake member is controlled by the gear adjusting mechanism to extend or retract relative to the bottom surface of the base so as to be linked with the brake member to be switched to a braking release state or a braking state;
   in the braking release state, the brake member is separated from the support surface, and the base is rotatably and translatably arranged relative to the support surface;
   in the braking state, the brake member extends to contact the support surface so as to lock displacement movement of the base relative to the support surface by a friction force between the brake member and the support surface, and the base is rotatably arranged about the brake member;
   wherein a drive rod is movably connected in the column tube in an interpenetrating manner, a top end of the drive rod is connected with the gear adjusting mechanism, a bottom end of the drive rod is connected with the brake member, and an inner wall of the column tube is provided with a support hole for the drive rod to be slidingly connected;
   wherein the bottom end of the drive rod is provided with a bearing member so that the brake member rotatably moves in the column tube; and
   wherein the gear adjusting mechanism comprises a rotary handle and a connecting end cap, the rotary handle is rotatably connected to the connecting end cap, the connecting end cap is arranged on a top end of the column tube, the connecting end cap is provided with a drive hole in a penetrating manner, and the top end of the drive rod is arranged on the rotary handle and is threadedly connected in the drive hole.

2. The device rack with a braking function according to claim 1, wherein the brake member comprises a rubber block and a first elastic member, the bearing member is provided with a telescopic mechanism, and the first elastic member is arranged in the telescopic mechanism and is connected with the rubber block.

3. The device rack with a braking function according to claim 2, wherein the base is provided with a movable hole in a penetrating manner for mounting the column tube, the telescopic mechanism comprises a mounting bracket, a guide column and a mounting housing, the mounting bracket is connected with the bearing member, the mounting bracket is provided with a through hole in a penetrating manner, a top end of the guide column is slidingly connected in the through hole, a bottom end of the guide column is connected with the mounting housing, and the rubber block is arranged on a bottom of the mounting housing and moves in the movable hole in an interpenetrating manner.

4. The device rack with a braking function according to claim 3, wherein the first elastic member is a spring, the first elastic member is arranged between the mounting bracket and mounting housing and is sleeved on the guide column, and an end of the guide column exposing the through hole is provided with a limiting member.

5. The device rack with a braking function according to claim 1, wherein the connecting end cap is formed with a gear cavity for the rotary handle to move, the gear cavity has a wavy ring cross section, the rotary handle is provided with at least one mounting tube, a gear member is slidingly connected in the mounting tube, a second elastic member is provided between the mounting tube and the gear member so that the gear member extends from the mounting tube and interferes with an inner concave portion or an outer convex portion of the gear cavity.

6. The device rack with a braking function according to claim 1, wherein the drive rod comprises a screw, an upper shaft rod and a lower shaft rod, the screw is threadedly connected in the drive hole, a bottom end of the lower shaft rod is connected with the brake member, a coupling is respectively provided between the screw and the upper shaft rod and between the upper shaft rod and the lower shaft rod to form the drive rod.

7. A device rack with a braking function, comprising:
a base for being placed on a support surface;
a plurality of universal rolling members provided on a bottom surface of the base;
a brake member telescopically and movably provided on the bottom surface of the base; and
a gear adjusting mechanism controlling the brake member to extend relative to the bottom surface of the base to cause the device rack to form a braking state or to retract to form a braking release state;
wherein,
in the braking release state, the brake member is separated from the support surface, and the base is movably arranged relative to the support surface in a rotatable and translatable manner so that a user can adjust distance or orientation of the device rack; and
in the braking state, the brake member extends to contact the support surface so as to lock displacement movement of the base relative to the support surface by a friction force between the brake member and the support surface, and the base is rotatably but non-translatably arranged about the brake member so that the user can adjust the orientation of the device rack;
wherein the device rack further comprises a column tube for fixing an audiovisual device, the column tube has a bottom end connected with the base; and the brake member is arranged at an underside of the column tube so that friction between the brake member and the support surface is strengthened by a weight of the audiovisual device fixed to the column tube;
wherein the gear adjusting mechanism is arranged on the column tube and acts on the brake member by means of a drive rod movably arranged in the column tube in an interpenetrating manner so that the brake member is driven by the gear adjusting mechanism to extend or retract;
wherein the gear adjusting mechanism is arranged on a top end of the column tube, and the drive rod has a top end connected with the gear adjusting mechanism and a bottom end pushing and pulling the brake member to extend or retract;
wherein the top end of the drive rod is connected with the gear adjusting mechanism and the bottom end thereof is connected with the brake member, and an inner wall of the column tube is provided with a support hole for the drive rod to be slidingly connected; and
the gear adjusting mechanism comprises a rotary handle and a connecting end cap, the rotary handle is rotatably connected to the connecting end cap, the connecting end cap is arranged on a top end of the column tube, the connecting end cap is provided with a drive hole in a penetrating manner, and the top end of the drive rod is arranged on the rotary handle and is threadedly connected in the drive hole.

8. The device rack with a braking function according to claim 7, wherein the bottom end of the drive rod is provided with a bearing member so that the brake member rotatably moves in the column tube;
the brake member comprises a rubber block and a first elastic member, the bearing member is provided with a telescopic mechanism, and the first elastic member is arranged in the telescopic mechanism and is connected with the rubber block;
the base is provided with a movable hole in a penetrating manner for mounting the column tube, the telescopic mechanism comprises a mounting bracket, a guide column and a mounting housing, the mounting bracket is connected with the bearing member, the mounting bracket is provided with a through hole in a penetrating manner, a top end of the guide column is slidingly connected in the through hole, a bottom end of the guide column is connected with the mounting housing, and the rubber block is arranged on a bottom of the mounting housing and moves in the movable hole in an interpenetrating manner; and
the first elastic member is a spring, the first elastic member is arranged between the mounting bracket and mounting housing and is sleeved on the guide column, and an end of the guide column exposing the through hole is provided with a limiting member.

9. The device rack with a braking function according to claims 7, wherein the connecting end cap is formed with a gear cavity for the rotary handle to move, the gear cavity has a wavy ring cross section, the rotary handle is provided with at least one mounting tube, a gear member is slidingly connected in the mounting tube, a second elastic member is provided between the mounting tube and the gear member so that the gear member extends from the mounting tube and interferes with an inner concave portion or an outer convex portion of the gear cavity.

10. The device rack with a braking function according to claim 7, wherein the device rack further comprises a mounting member, and the mounting member is fixed to the column tube for fixing the audiovisual device;
the column tube comprises an upper column and a lower column, a connector is provided between the upper column and the lower column, ends of the connector are detachably connected with the upper column and the lower column respectively, and the support hole penetrates to the middle of the connector; and
the drive rod comprises a screw, an upper shaft rod and a lower shaft rod, the screw is threadedly connected in the drive hole, a bottom end of the lower shaft rod is connected with the brake member, a coupling is respectively provided between the screw and the upper shaft rod and between the upper shaft rod and the lower shaft rod to form the drive rod.

* * * * *